Figure 1:
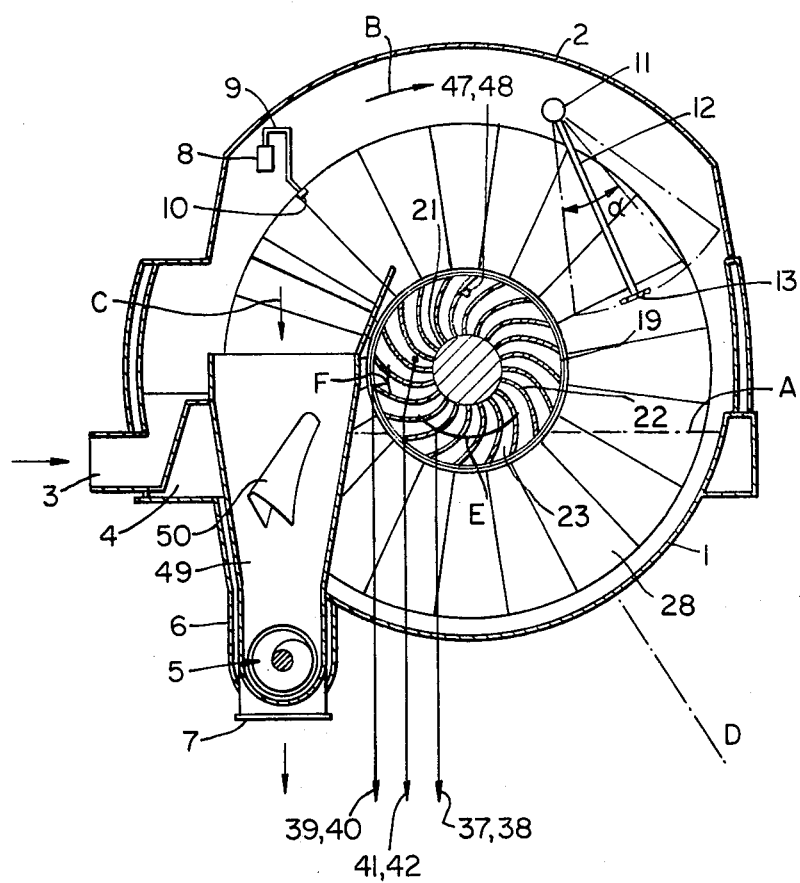

# United States Patent [19]

Toivonen

[11] 4,136,028
[45] Jan. 23, 1979

[54] METHOD FOR FILTERING A FIBROUS MATERIAL BY MEANS OF A DISC FILTER AS WELL AS A DISC FILTER FOR PERFORMING THE METHOD

[75] Inventor: Martti Toivonen, Rauma, Finland

[73] Assignee: Rauma-Rapola Oy, Finland

[21] Appl. No.: 831,389

[22] Filed: Sep. 8, 1977

[30] Foreign Application Priority Data

Sep. 13, 1976 [FI] Finland ................................. 762626

[51] Int. Cl.² ............................................. B01D 33/08
[52] U.S. Cl. .................................. 210/73 R; 210/331; 210/347; 210/77
[58] Field of Search ............... 210/331, 332, 345–347, 210/340, 407, 408, 409, 73 R, 77

[56] References Cited

U.S. PATENT DOCUMENTS

| | | | |
|---|---|---|---|
| 2,864,503 | 12/1958 | Hunter | 210/331 |
| 3,591,009 | 7/1971 | Luthi | 210/331 |
| 4,032,442 | 6/1977 | Peterson | 210/408 |
| 4,056,473 | 11/1977 | Nilsson | 210/331 |

Primary Examiner—William A. Cuchlinski, Jr.
Assistant Examiner—Jon E. Hokanson
Attorney, Agent, or Firm—Burns, Doane, Swecker & Mathis

[57] ABSTRACT

The filtered liquid present in the rotating compartments of the core of a disc filter is suctioned out of the filter through two separate zones. Muddy or turbid filtrate is drawn out as the compartments pass through a first zone lying near the bottom point in the rotation of the compartments. Thereafter, the compartments pass through a second zone located in the region of the first 60° of the upward movement of the compartments, in which zone the clear filtrate is drawn out. The compartments have a slight axial pitch and their surfaces are concave so that, as the compartment moves in the upward direction, the filtrate flows towards the discharge ports of the filter.

12 Claims, 2 Drawing Figures

METHOD FOR FILTERING A FIBROUS MATERIAL BY MEANS OF A DISC FILTER AS WELL AS A DISC FILTER FOR PERFORMING THE METHOD

The present invention relates to a method for filtering a fibrous material by means of a disc filter which consists of a compartment axle provided with compartments placed substantially longitudinally on the axle, of discs mounted on the compartment axle and provided with filtering faces, the channels of said discs being connected to corresponding axle channels, of distributor valves which connect the axle compartment alternatingly to vacuum and to atmospheric pressure and possibly also to a pressure higher than the atmospheric pressure while the axle is rotating. The present invention is also related to a disc filter for performing the method.

The disc filter in accordance with the present filter is designed, for example, for sedimenting the wood pulps used for paper production.

For the purpose concerned, either drum filters or disc filters are used. A drawback of the drum filter is the small filtering surface as compared to the constructional volume taken by the apparatus.

The disc filter has a remarkably larger filtering area for the same volume taken by the apparatus than the drum filter, and therefore, as a machine type, it is more suitable for sedimenting paper pulps, especially after sorting, when the thickness of the pulp is low and the water-removing properties are poor and, consequently, a large filtering area is needed. The disc filters so far used, however, involve several both constructional and functional drawbacks because of which the reliability in operation of the apparatuses is not satisfactory and the filtering result obtained, both in respect of the dry-material content, i.e. thickness, of the pulp and in respect of the production quantity, also leaves a great deal to be desired. The present invention attempts to eliminate the drawbacks mentioned above.

The invention is defined more closely in the patent claims, and it is based on the observation that the filtering process is considerably faster and of shorter duration than what the disc filters in use at present are suitable for.

In studies that have been performed it has been noticed that in particular extensively ground paper pulps very rapidly form a pulp web on the filter face, and thereupon the flow of the filtrate through the pulp web is very rapidly reduced.

This means that the inside units of a disc filter of a capacity that is high in relation to the production capacity and to the removal thickness of the filtered material must be hydraulically such that the filter guarantees a sufficient time preceding the loosening, for drying the pulp layer, when a speed range considerably higher than the speed of rotation of the present disc filters is used.

By means of the method and apparatus in accordance with the invention, the following advantages are obtained:
- high production per area of filtering face
- high leaving thickness.

Both of these circumstances have a considerable significance for the pulp treatment, sedimenting of ground-pulp etc., purifying the circulation water, etc. in a modern, high-capacity paper mill.

The attached drawings illustrate the construction of the disc filter in accordance with the present invention.

Figure 2:
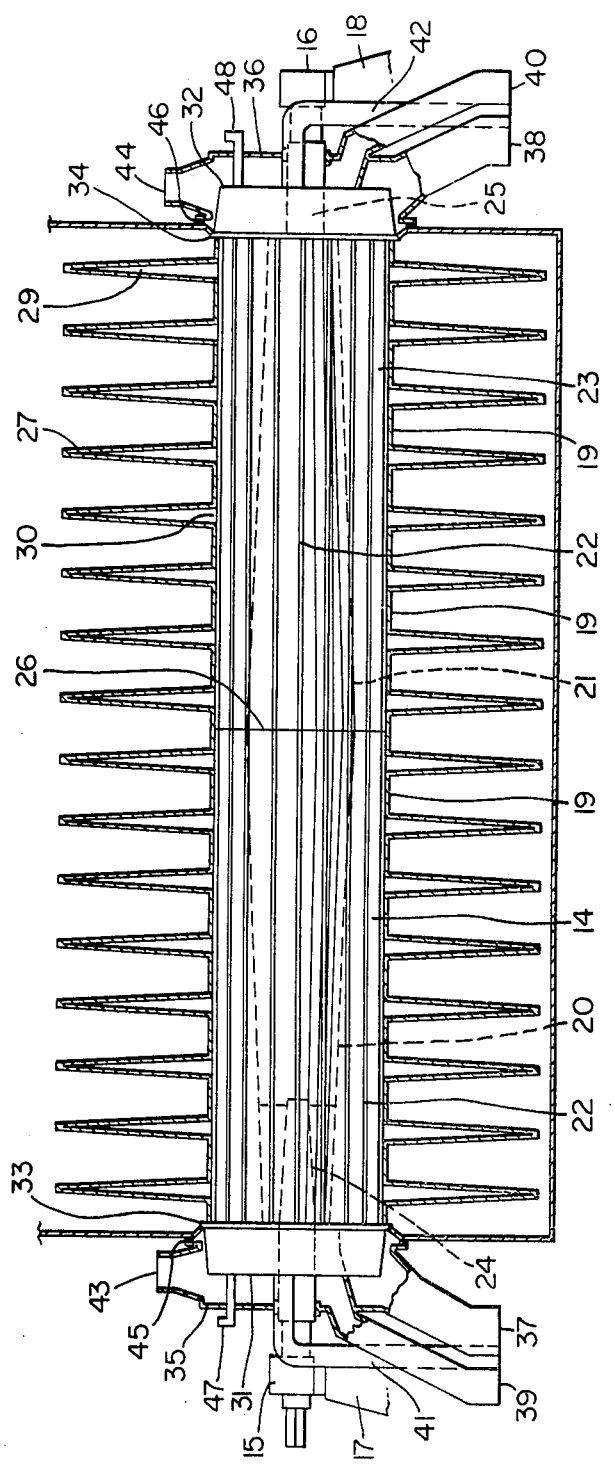

FIG. 1 shows a cross-sectional view of a filter in accordance with the invention and FIG. 2 shows a longitudinal section of the filter.

A basin 1 constitutes the body of the filter. A mantle 2 is fastened to the basin, the purpose of which mantle is to encase the mobile parts of the filter and to isolate them from the environment. Among other things, pipe connections 3 are fitted to the basin for the introduction of the pulp into the basin, as well as a threshold 4 for even distribution of the pulp. Moreover, the basin is provided with a conveyor screw 5 for the removal of the sedimented pulp, in casing 6, to which the connection 7 of the pulp-removal pipe is also fitted.

The mantle 2 is provided, e.g., with a pulp-loosening water pipe 8, from which the jet pipes 9 are branched, said jet pipes being provided with nozzles 10. Moreover, the mantle is provided with a pipe 11 for the wire-sieve washing water and with branch pipes 12 and nozzles 13 fastened to said pipe 11. The washing water pipe is mounted as rotable around its axis back and forth within the angle α.

A compartment axle 14 is fitted into the basin 1, which axle is mounted as rotable by means of bearings 15 and 16 and bearing brackets 17 and 18. The compartment axle 14 consists of a cylindrical mantle 19 and of preferably conical axle pipes 20 and 21, placed inside said mantle, the wider ends of said pipes facing opposite each other. Between the mantle 19 and the conical pipes 20 and 21, there are longitudinal partition walls 22 which divide the space between the mantle 19 and the pipes 20, 21 into sectors, thereby forming compartments 23, which may be, for example, of the shape shown in FIG. 1.

Inside the axle tubes, gudgeons 24 and 25 are fitted, on which the bearings 15 and 16 are mounted. The end of the gudgeon 24 is designed as suitable for a drive unit, e.g. a pin clutch (not shown in the drawings). FIG. 2 shows a longitudinal section of the filter. In this figure, among other things, the 2-end construction of the compartment axle is seen, in which the axle compartments start from the flange-shaped partition wall 26 in the middle of the axle and pass to both ends of the axle.

Onto the compartment axle 14, filter discs 27 are fitted which consist of disc sectors 28. Each disc comprises, e.g., 20 sectors. They are of a construction in itself known. Their sector-shaped plane faces are of a construction pervious to water, e.g. perforated discs, and a space 29 remains between them. Onto the disc sectors, a filter fabric is fastened in a way in itself known. The root portion of the disc sector, and correspondingly the axle, is provided with an opening 30, through which the interior space 29 of the disc sector is connected to the axle compartment 23. Each axial row of sectors consisting of the sectors placed in the different discs one after the other is connected to one axle compartment 23.

E.g., plane sealing components 31 and 32 are placed at the ends of the compartment axle 14 in a way in itself known. Gaskets 33 and 34 are placed on the circumference of the compartment axle. The rotary axle compartments 23, sealed both by means of the sealing components 31 and 32 and by means of the gaskets 33 and 34, are alternatingly connected to vacuum and atmospheric pressure, and possibly also to a pressure higher than the atmospheric pressure, i.e. the gaskets constitute the sealing means of the so-called distributor valve. The body of the distributor valve consists of the valve chambers 35 and 36 fitted at the ends of the compartment axle 14 and of the basin 1, into which the filtrate-removal ducts 37, 38, 39, 40, 41, and 42 are fitted, among them the ducts 37 and 38 being intended for the so-called turbid filtrate, the ducts 39 and 40 for the so-called clear filtrate, and the ducts 41 and 42 for the so-called residual filtrate. For the purpose of separating the filtrates from each other, the valve chamber 35, 36 is provided with partition wall 53. The upper portion of the valve chamber 35, 36 is provided with a pipe connection 43, 44, to which the suction pipe of the suction pump is connected.

The valve chamber 35, 36 is sealed against the basin by means of gaskets 45, 46. The sealing component 31, 32 has connections of pipes 47, 48, which connect the interior space 29 of the compartment axle 14 and of the disc sector to the open air or possibly to a pressure higher than the atmospheric pressure, e.g., once per revolution of the axle.

The pulp sludge to be filtered is pumped through the pipes 3 and over the threshold 4 into the basin 1, where its level is maintained, for example, at the level A, part of the discs and of the compartment axle being then submerged in the pulp sludge.

When the axle rotates in the direction of the arrow B, a pulp layer is formed on the surface of the filter discs, which layer is removed in the direction of the arrow C by using a loosening jet as an aid, which jet comes from the nozzle 10 and is directed at the pulp layer. Between the discs, there are vertical tubes 49, into which the pulp cake 50 loosened from the disc sector by means of the loosening jet falls and from which the pulp is removed by means of the conveyor screw 5. The filtrate separated from the pulp sludge enters the space 30 in a disc sector by the effect of the suction, and from there enters into the axle compartment associated with the disc sector, from where the filtrate flows through the distributor valve and the ducts 37-42 into the filtrate tank.

Slightly before the disc sector arrives at the pulp-loosening point, the distributor valve shuts-off the suction from the axle compartment concerned and connects said compartment to atmospheric pressure, whereby the loosening of the pulp cake becomes easier. By means of wire-sieve washing pipes 11, 12 and 13, by means of water jets, the filter fabric is cleaned before the sector is submerged into the pulp sludge. After the disc sector has been submerged into the pulp sludge, the suction is switched on by means of the distributor valve to the axle compartment concerned approximately at D. Thus, the operation of the filter is mainly previously known.

In extensive studies performed by the applicant, it has been noticed that, in particularly with so-called paper pulps, the filtering process is at the beginning of the filtering very rapid but is slowed down within a few seconds so that the filtered quantity of water per unit of time is very rapidly reduced to a small fraction of what it was at the beginning of the filtering. It has been noticed that, when high output per unit of filtering area and high leaving thickness are aimed at, the construction of the filter must be such that the filter is capable of efficiently removing the momentary but high quantity of filtrate flowing in each axle compartment. This results in the fact that the emptying of the disc sectors of the filter takes place rapidly, thereby more time being allowed for the drying of the pulp layer, which correspondingly means a higher loosening thickness and as such already permits the use of a higher number of revolutions per unit of time and consequently a higher output. At the same time this makes it possible to increase the speed of rotation and the production by permitting a lower level of the pulp in the basin.

The walls 22 between the axle compartments 23 are, according to the invention, designed so that the longitudinal direction of the axle compartment 23 and, at the same time, of the partition wall 22 diverge from the direction of the centre line of the axle so that the end of the axle compartment 23 nearest to the distributor valve and the corresponding end of the partition wall 22 are, as compared with the opposite end of the axle compartment and partition wall, limited by the transversal partition wall 26, lagging behind in respect of the direction of rotation. Then, the end of the partition wall 22 more distant from the suction valve rises from the pulp sludge before the end nearest to the suction valve. Preferably, the longitudinal direction of the partition wall 22 diverges from the longitudinal direction of the axle so that the inner longitudinal edge of the partition wall forms a screw line. The screw line is steeply rising and its direction differs only slightly from the centre line of the axle. A suitable rise is, for example, such that one end of a 4-meter long partition wall is about 15 to 20° ahead of the other end.

The transversal direction of the axle compartment 23 and of the partition wall 22 differs from the direction of the radius of the cylinder 19 so that the portion of compartment and edge of partition wall nearest to the axle centre are, as compared with the portion of compartment and edge of partition wall more distant from the axle centre, lagging behind in respect of the direction of rotation. Then, the outer edge of the partition wall 22 rises from the pulp sludge before the inner edge. Preferably the partition wall 22 is also curved in the transversal direction so that, when the axle rotates, the concave side moves ahead.

By means of the design of partition walls 22 described above, it is achieved that, when the compartment axle 14 rotates, on the side of same that rises upwards, the partition wall 22 is at every point slanting downwards in the direction of flow of the filtrate and towards the removal connections of the filtrate.

Only two partition walls 22 are shown in FIG. 2, in order to keep the drawing clear. The two adjacent walls shown are located on the left hand side of FIG. 1, and they are shown as seen from the left hand side of FIG. 1 towards the right hand side. In FIG. 2, reference number 51 indicates the outer edge of one partition wall and number 51' indicates the inner edge of the same partition wall. The outer edge of the other partition wall is indicated by number 52, and the inner edge of the same wall, shown by a broken line, is indicated by number 52'.

The so-called suction zone through which the the axle compartments 23 pass, is subject to vacuum, is divided into two parts E and F so that the so-called muddy or turbid filtrate is removed as the compartment passes through the first suction zone E. As the compartment passes through the second zone F, the so-called clear or pure filtrate, is filtered through a disc surface already partly covered by the pulp. The division point between the zones E and F defined by the wall 53, is selected so that in the separating zone F for the clear filtrate, the suction begins when the axle compartment 23 is, in the direction of rotation of the axle, between the bottom position and 60° after the bottom position, preferably between 10 and 50°, most appropriately between 15 and 45° after the bottom point. In the first zone subject to suction, i.e. so-called zone E for muddy filtrate, the suction in the axle compartment starts at the earliest when the compartment is 45° before the bottom position of the axle compartment.

The embodiment described here is only intended as an example and by no means restricts the invention only to what is stated in the patent specification. For example, the number of discs may differ, the filter may be a 1-end filter, the mutual proportions of the discs may be different from those coming out from the drawing, the shape of the distributor valve may be different, the filter may be provided with a suction pump, or it may be of a self-sucking type, the loosening of the pulp web may alternatively take place after the top position of the sector, etc. The invention is restricted to what is defined in the patent claims.

What we claim is:

1. A method for filtering a fibrous material by means of a disc filter comprising the steps of:
    rotating about a substantially horizontal axis, an axle having a plurality of longitudinal compartments therein and at least one filter disc sector associated with each compartment;
    passing said compartments through a first vacuum zone as said compartments approach the lowest point in their path of rotation, to draw turbid filtrate through at least one of said disc sectors;
    discharging said turbid filter from the filter through a first discharge conduit;
    passing said compartments through a second vacuum zone as said compartments pass through the first 60° of upward movement in their path of rotation, to draw relatively clear filtrate through at least one of said disc sectors;
    discharging said relatively clear filtrate from the filter through a second discharge conduit; and
    removing the vacuum from said compartments at a point along the path of rotation of said compartments, to permit unfiltered material to be discharged from the filter.

2. The method of claim 1 wherein said second vacuum zone is located in the area of the first 10°–50° of upward movement of said compartments.

3. The method of claim 2 wherein said second vacuum zone is located in the area of the first 15°–45° upward movement of said compartments.

4. The method of claim 1 wherein said compartments pass through at least 135° of downward rotation before entering said first vacuum zone.

5. In a disc filter for filtering fibrous material including an axle mounted for rotation about a substantially horizontal axis, said axle having a plurality of substantially longitudinal compartments therein defined by a plurality of substantially longitudinal walls, at least one filter disc sector associated with each compartment, and distributor valve means located at one end of said axle for subjecting some of said compartments to a source of vacuum and others of said compartments to a source of atmospheric or higher pressure, the improvement wherein:
    said compartments are disposed at an angle with respect to the center line of said axle whereby the end of each compartment farthest from said distributor valve means leads the end of said compartment closest to said distributor valve means with respect to the direction of rotation of said axle.

6. The disc filter of claim 5 wherein said walls slant downward toward said distributor filter means when said walls are moving upward in the path of rotation.

7. The disc filter of claim 5 wherein said axle includes first and second concentric tubular components, said walls being located between said first and second tubular components, further including openings in the outermost of said components to provide fluid communication between said compartments and the filter disc sectors.

8. The disc filter of claim 5, wherein said distributor valve means includes means for separating filtrate into clear and turbid filtrate.

9. The disc filter of claim 8 wherein said separating means includes first vacuum means for drawing turbid filtrate from compartments located near or at the bottom of the path of rotation, and second vacuum means for drawing clear filtrate from compartments located in the upward portion of the path of movement.

10. The disc filter of claim 5 wherein said walls are inclined with respect to the radial direction whereby the radially outermost portion of each compartment leads the portion of said compartment closest to the center of said axle with respect to the direction of rotation of said axle.

11. The disc filter of claim 10 wherein said walls have straight sides which are disposed at an angle with respect to the radial direction.

12. The disc filter of claim 10 wherein said walls have curved sides with the concave side of the walls being the forwardmost portion of the wall with respect to the direction of motion.

* * * * *